(12) United States Patent
Marble

(10) Patent No.: US 7,841,658 B1
(45) Date of Patent: Nov. 30, 2010

(54) AIRLINE CHAIR COVER SYSTEM

(76) Inventor: Karen R. Marble, 6302 E. Hern Rd., Scottsdale, AZ (US) 85254

( * ) Notice: Subject to any disclaimer, the term of this patent is extended or adjusted under 35 U.S.C. 154(b) by 15 days.

(21) Appl. No.: 12/361,156

(22) Filed: Jan. 28, 2009

(51) Int. Cl.
*A47C 31/11* (2006.01)
*B65D 65/02* (2006.01)

(52) U.S. Cl. ............... 297/224; 297/228.1; 297/228.11; 297/229; 150/158

(58) Field of Classification Search ............... 297/224, 297/228.1, 228.11, 228.12, 228.13, 229; 150/158
See application file for complete search history.

(56) References Cited

U.S. PATENT DOCUMENTS

| | | | | |
|---|---|---|---|---|
| 2,457,725 | A * | 12/1948 | Rhowmine | 297/148 X |
| 3,729,037 | A * | 4/1973 | Dare et al. | 150/158 |
| 3,804,458 | A | 4/1974 | Jannoni | |
| D264,401 | S | 5/1982 | Trotman et al. | |
| 4,553,785 | A * | 11/1985 | Duke et al. | 297/229 |
| 4,718,721 | A * | 1/1988 | Pompa | 297/228.11 |
| 4,725,094 | A * | 2/1988 | Greer | 297/229 |
| 4,877,288 | A * | 10/1989 | Lee | 297/229 |
| 5,005,901 | A | 4/1991 | Hinde | |
| 5,150,945 | A | 9/1992 | Aupperlee et al. | |
| 5,275,463 | A * | 1/1994 | Rocha | 297/229 |
| 5,326,152 | A * | 7/1994 | Baron | 297/229 |
| 5,533,787 | A * | 7/1996 | Xiang | 297/228.1 X |
| 5,573,288 | A | 11/1996 | Raffensperger | |
| D377,574 | S | 1/1997 | Mades | |
| 5,655,813 | A | 8/1997 | Kirkpatrick | |
| 5,802,643 | A * | 9/1998 | Sloot | 297/220 X |
| 5,806,925 | A | 9/1998 | Hanley | |
| 5,850,643 | A * | 12/1998 | Brumfield | 5/419 |
| 6,131,995 | A * | 10/2000 | Smith | 297/229 |
| 6,149,234 | A * | 11/2000 | Daniels | 297/229 |
| 6,217,116 | B1 * | 4/2001 | Sloot | 297/220 X |
| 6,334,650 | B1 * | 1/2002 | Chien-Chuan | 297/228.1 X |
| 6,592,179 | B1 * | 7/2003 | Miyazaki | 297/146 |
| 6,616,225 | B2 * | 9/2003 | Graff | 297/229 |
| 6,626,491 | B1 * | 9/2003 | Blome et al. | 297/229 |
| 6,631,950 | B1 * | 10/2003 | Madole | 297/228.11 |
| 6,655,735 | B1 | 12/2003 | Learning | |
| 6,676,209 | B1 * | 1/2004 | Szabo et al. | 297/228.13 X |
| 6,848,746 | B2 * | 2/2005 | Gentry | 297/228.1 X |
| 6,948,771 | B1 | 9/2005 | Salandy | |
| 7,000,984 | B1 * | 2/2006 | Ward | 297/228.12 |
| 7,374,240 | B2 * | 5/2008 | Gold et al. | 297/229 X |
| 7,621,593 | B2 * | 11/2009 | Dickinson | 297/163 |
| 2002/0178975 | A1 * | 12/2002 | Lewis et al. | 150/158 X |
| 2002/0185898 | A1 * | 12/2002 | Smith | 297/224 |
| 2006/0214479 | A1 * | 9/2006 | Dwire et al. | 297/163 |
| 2007/0029849 | A1 * | 2/2007 | Eckstein et al. | 297/153 |

(Continued)

*Primary Examiner*—Rodney B White

(57) ABSTRACT

An airline chair cover system includes an airline chair that includes a seat portion and a backrest attached to and extending upwardly from the seat portion. A flexible panel is removably positioned on top of the chair to cover the seat portion and the backrest. The panel includes an upper edge, a lower edge and a pair of lateral edges. A peripheral wall is attached to and is coextensive with each of the upper edge, the lower edge and the pair of lateral edges. The peripheral wall has a perimeter edge positioned distal to the panel. The peripheral wall is removably positioned on a top edge of the backrest, a front edge of the portion and lateral sides of the backrest and the seat portion. The panel covers an upper surface of the backrest and the seat portion.

5 Claims, 5 Drawing Sheets

U.S. PATENT DOCUMENTS

2007/0210627 A1* 9/2007 McConnell et al. ......... 297/224
2007/0216202 A1* 9/2007 Dickinson ................... 297/163
2009/0014106 A1* 1/2009 Barrell ....................... 150/158
2010/0001565 A1* 1/2010 Gray et al. .................. 297/229

* cited by examiner

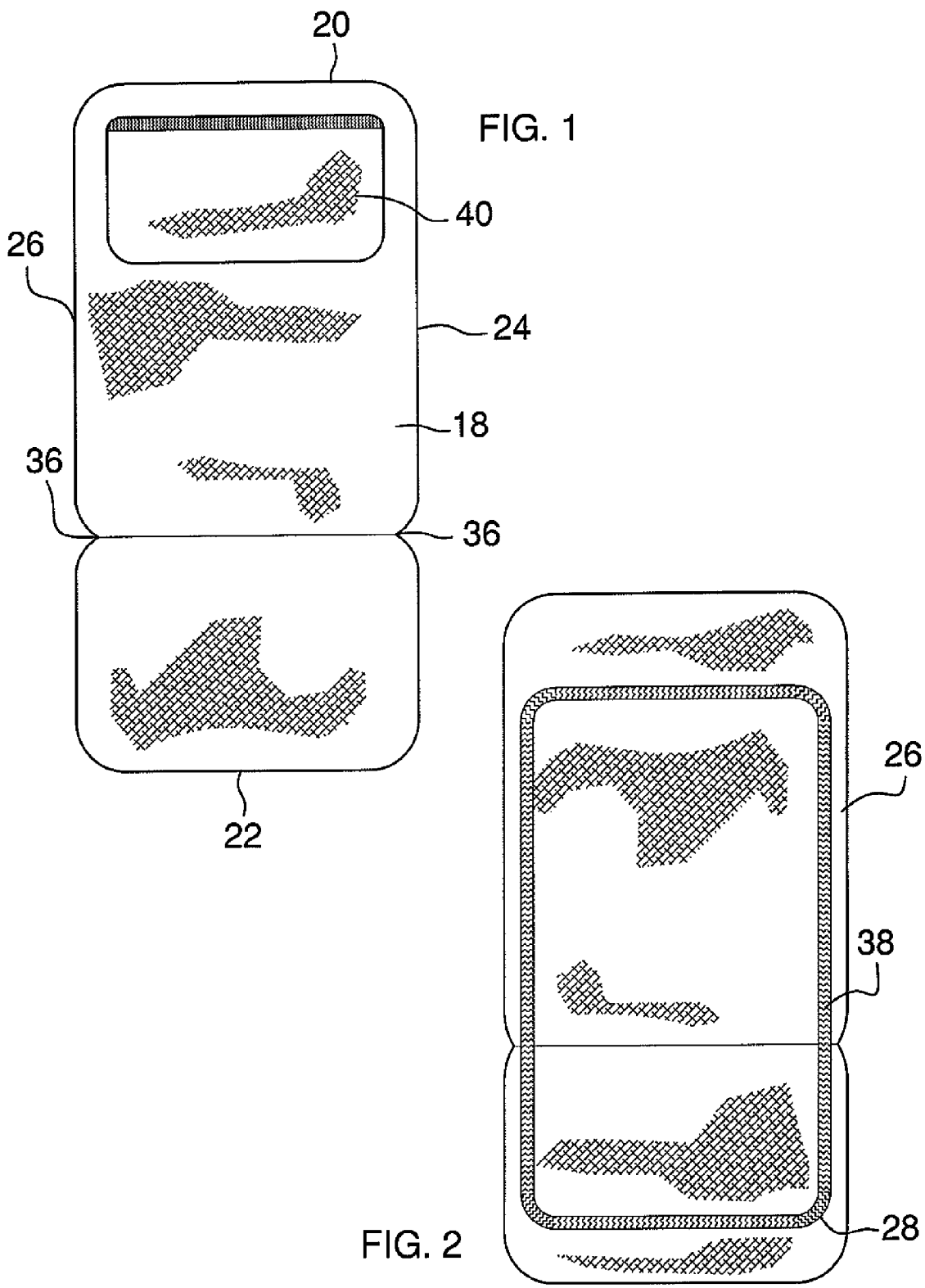

AIRLINE CHAIR COVER SYSTEM

BACKGROUND OF THE INVENTION

Field of the Invention

The present invention relates to seat cover devices and more particularly pertains to a new seat cover device for covering an airline chair for sanitary purposes.

SUMMARY OF THE INVENTION

The present invention meets the needs presented above by generally comprising an airline chair that includes a seat portion and a backrest attached to and extending upwardly from the seat portion. A flexible panel is removably positioned on top of the chair to cover the seat portion and the backrest. The panel includes an upper edge, a lower edge and a pair of lateral edges. A peripheral wall is attached to and is coextensive with each of the upper edge, the lower edge and the pair of lateral edges. The peripheral wall has a perimeter edge positioned distal to the panel. The peripheral wall is removably positioned on a top edge of the backrest, a front edge of the portion and lateral sides of the backrest and the seat portion. The panel covers an upper surface of the backrest and the seat portion. The upper edge of the panel is positioned adjacent to the top edge of the backrest.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a covering of an airline chair cover system according to the present invention.

FIG. 2 is a rear view of the present invention.

DESCRIPTION OF THE PREFERRED EMBODIMENT

Figure 3:
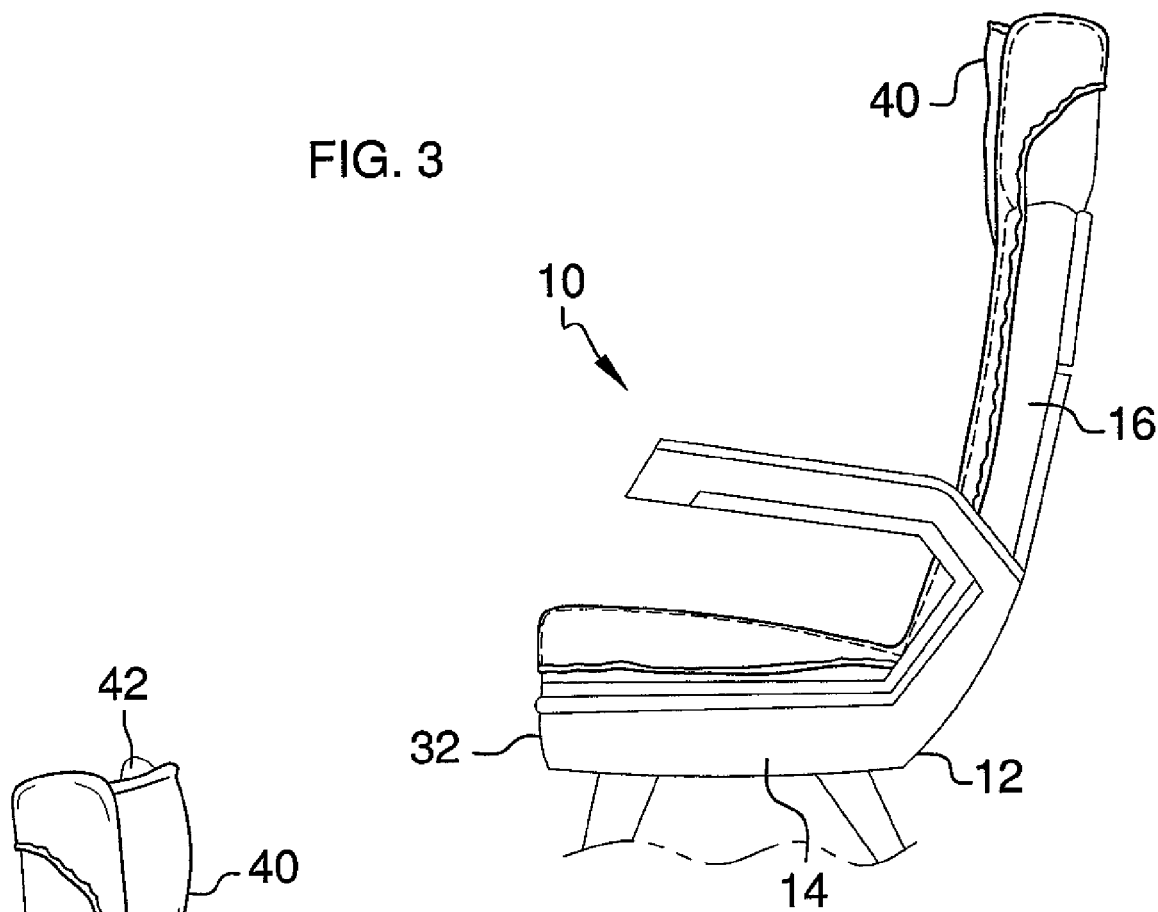
FIG. 3 is a side view of the present invention.
Figure 4:
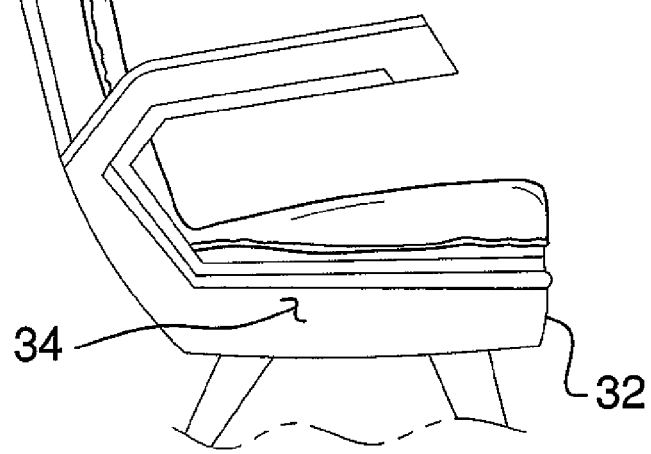
FIG. 4 is a side view of the present invention.
Figure 5:
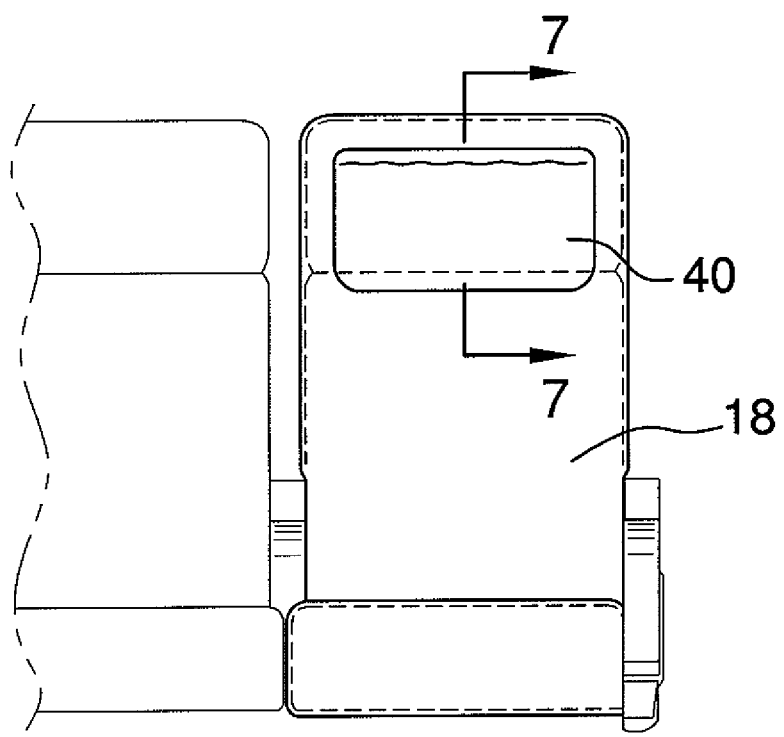
FIG. 5 is a front view of the present invention.
Figure 6:
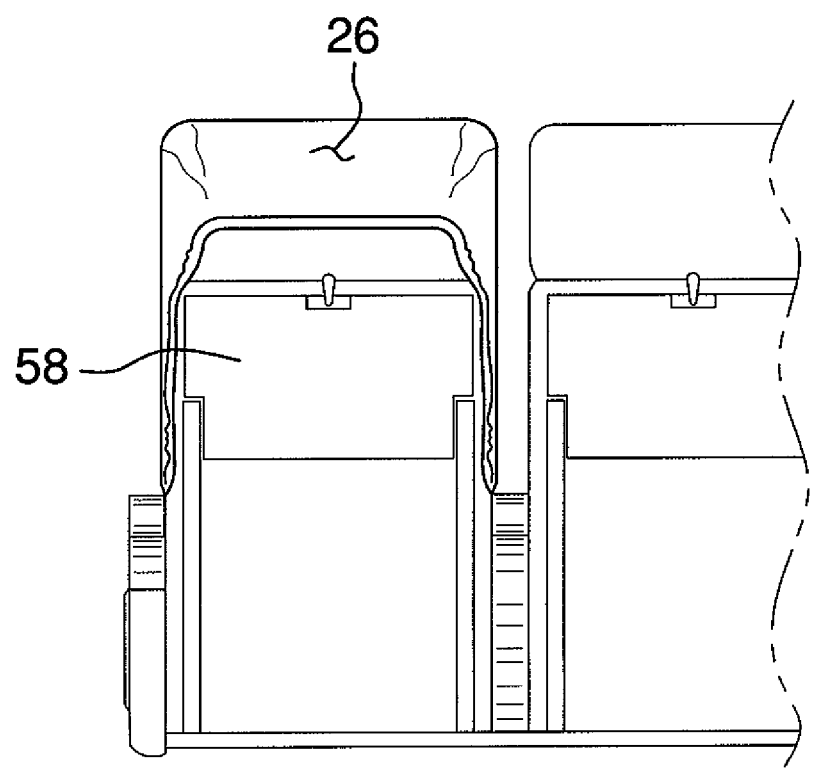
FIG. 6 is a rear view of the present invention.
Figure 7:
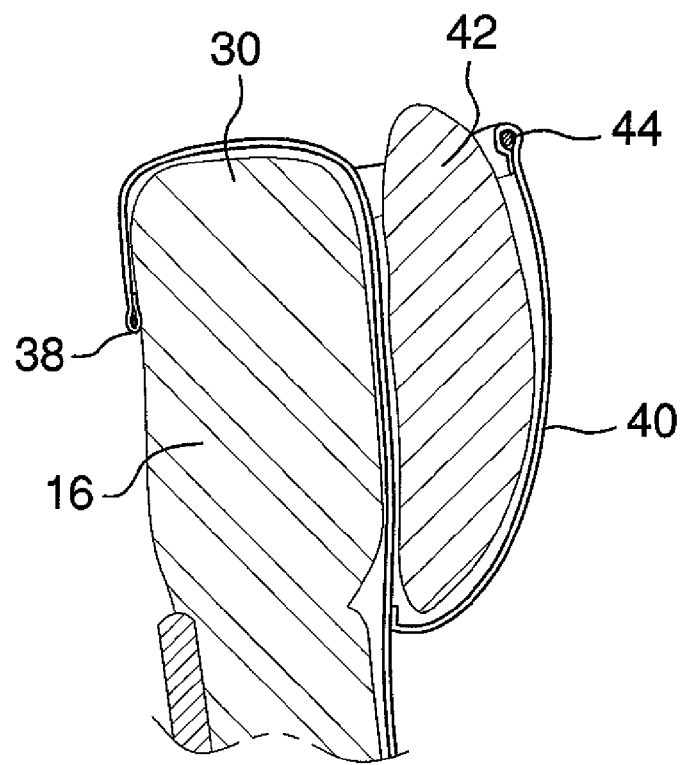
FIG. 7 is a cross-sectional view of the present invention taken along line 7-7 of FIG. 5.
Figure 8:
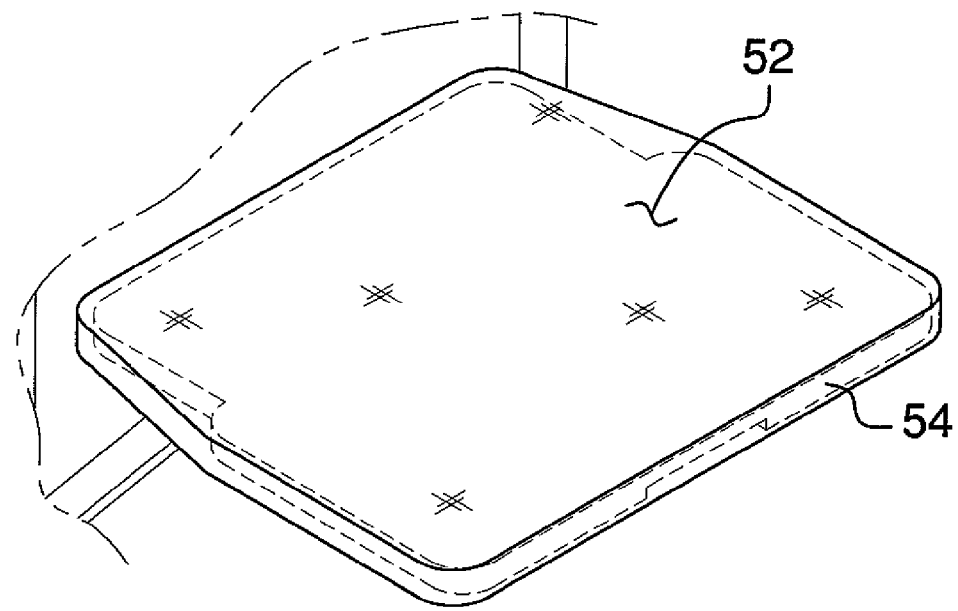
FIG. 8 is a top perspective view of a tray cover of the present invention.
Figure 9:
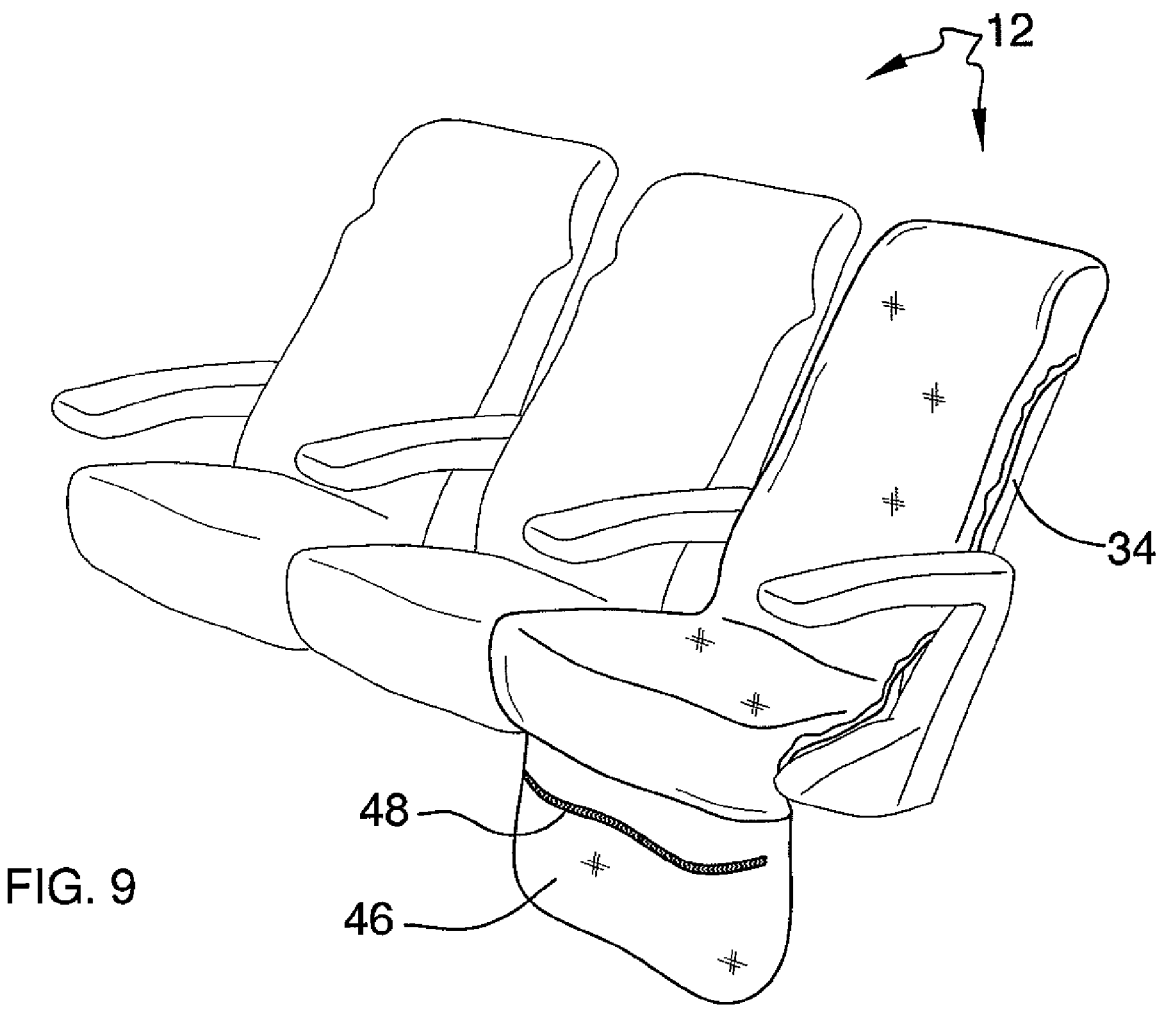
FIG. 9 is a front perspective view of an embodiment of the present invention.
Figure 10:
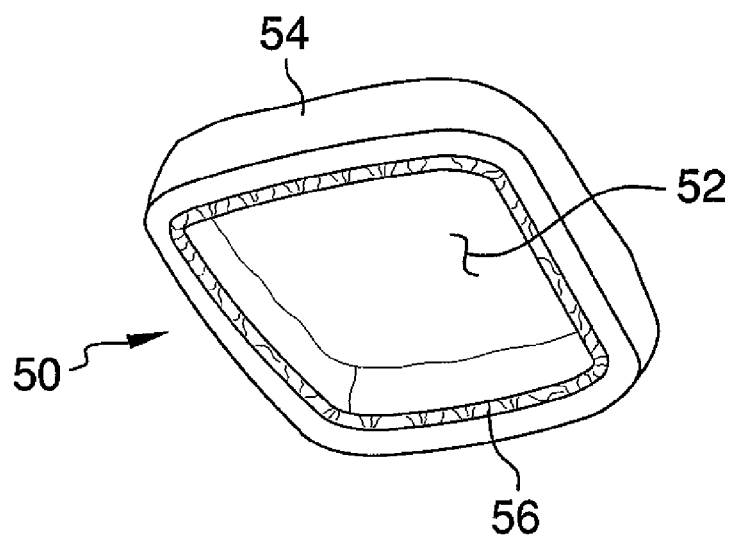
FIG. 10 is a bottom perspective view of the present invention.

With reference now to the drawings, and in particular to FIGS. 1 through 10 thereof, a new seat cover device embodying the principles and concepts of the present invention and generally designated by the reference numeral 10 will be described.

As best illustrated in FIGS. 1 through 10, the airline chair cover system 10 generally comprises a conventional airline chair 12 including seat portion 14 and a backrest 16 that is attached to and extends upwardly from the seat portion 14. Typically the chair 12 will be in one of a plurality of rows of chairs 12 wherein each row includes two or more abutting chairs.

A flexible panel 18 is removably positioned on top of the chair 12 to cover the seat portion 14 and the backrest 16. The panel 18 includes an upper edge 20, a lower edge 22 and a pair of lateral edges 24. A peripheral wall 26 is attached to and is coextensive with each of the upper edge 20, the lower edge 22 and the pair of lateral edges 24. The peripheral wall 26 has a perimeter edge 28 positioned distal to the panel 18. The peripheral wall 26 is removably positioned on a top edge 30 of the backrest 16, a front edge 32 of the seat portion 14 and lateral sides 34 of the backrest 16 and the seat portion 14. The lateral edges 24 may include indentations 36 to better conform to the shape of the chair 12. The panel 18 covers an upper surface of the backrest 16 and the seat portion 14. The upper edge 20 of the panel 18 is positioned adjacent to the top edge 30 of the backrest 16. The panel 18 and peripheral wall 26 may be comprised of any conventional material used for a seat cover including but not limited to plastic, paper, natural cloth materials and synthetic cloth materials. A resiliently elastic band 38 is attached to and is coextensive with the perimeter edge 28. The band 38 frictionally engages the chair 12 to retain the panel on the chair 12.

A pillow pouch 40 is attached to the panel and is positioned adjacent to the upper edge 20. A pillow 42 is positionable in the pouch 40 to allow a person seated in the chair 12 to have the pillow 42 positioned behind their head. An upper edge of the pouch 40 may be resiliently elastic or may have a resiliently elastic strap 44 therein to retain the pillow 42 within the pouch 40.

A storage pouch 46 is attached to the panel 18 adjacent to the lower edge 22. The storage pouch 46 hangs downwardly from the front edge 32 of the seat portion 14. The storage pouch 46 receives items to be stored by a person seated in the chair 12 and may be used for holding their shoes. An opening 48 of the storage pouch may be comprised of a resiliently elastic material to prevent articles therein from falling out of the storage pouch 46.

Additionally, the system 10 may include a tray cover 50 including a top wall 52 and a perimeter wall 54 being attached to and extending downwardly therefrom. An elastic band 56 is attached to and coextensive with the perimeter wall to retain the tray cover 50 on a tray 58 which is extendable outwardly from the chair 12 or from the backside of an adjacent and forwardly positioned chair.

In use, the panel 18 is placed on the chair 12 as described above and as indicated in the Figures. The panel 18 protects the person seated in the chair 12 from any unsanitary conditions of the chair while also providing a place for a person to position a pillow 42 or store their personal articles.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A covering system comprising:

an airline chair including seat portion and a backrest being attached to and extending upwardly from said seat portion;

a flexible panel being removably positioned on top of said chair to cover said seat portion and said backrest, said panel including an upper edge, a lower edge and a pair of lateral edges;

a peripheral wall being attached to and being coextensive with each of said upper edge, said lower edge and said pair of lateral edges, said peripheral wall having a perimeter edge positioned distal to said panel, said peripheral wall being removably positioned on a top edge of said backrest, a front edge of said seat portion and lateral sides of said backrest and said seat portion and said panel covering an upper surface of said backrest and said seat portion, said upper edge of said panel being positioned adjacent to said top edge of said backrest;

a storage pouch being attached to said panel adjacent to said lower edge, said storage pouch hanging downwardly from said front edge of said seat portion, said storage pouch receiving items to be stored by a person seated in said chair; and a tray cover including a top wall and a perimeter wall being attached to and extending downwardly therefrom, an elastic band being attached to and coextensive with said perimeter wall to retain said tray cover on a tray, said tray being extendable outwardly from said chair or from a backside of an adjacent and forwardly positioned second chair.

2. The system according to claim 1, further including a resiliently elastic band being attached to and being coextensive with said perimeter edge, said band frictionally engaging said chair to retain said panel on said chair.

3. The system according to claim 2, further including a pillow pouch being attached to said panel and being positioned adjacent to said upper edge, a pillow being positionable in said pouch to allow a person seated in the chair to have the pillow positioned behind their head.

4. The system according to claim 1, further including a pillow pouch being attached to said panel and being positioned adjacent to said upper edge, a pillow being positionable in said pouch to allow a person seated in the chair to have the pillow positioned behind their head.

5. A covering system comprising:

an airline chair including seat portion and a backrest being attached to and extending upwardly from said seat portion;

a flexible panel being removably positioned on top of said chair to cover said seat portion and said backrest, said panel including an upper edge, a lower edge and a pair of lateral edges;

a peripheral wall being attached to and being coextensive with each of said upper edge, said lower edge and said pair of lateral edges, said peripheral wall having a perimeter edge positioned distal to said panel, said peripheral wall being removably positioned on a top edge of said backrest, a front edge of said seat portion and lateral sides of said backrest and said seat portion and said panel covering an upper surface of said backrest and said seat portion, said upper edge of said panel being positioned adjacent to said top edge of said backrest;

a resiliently elastic band being attached to and being coextensive with said perimeter edge, said band frictionally engaging said chair to retain said panel on said chair;

a pillow pouch being attached to said panel and being positioned adjacent to said upper edge, a pillow being positionable in said pouch to allow a person seated in the chair to have the pillow positioned behind their head;

a storage pouch being attached to said panel adjacent to said lower edge, said storage pouch hanging downwardly from said front edge of said seat portion, said storage pouch receiving items to be stored by a person seated in said chair; and a tray cover including a top wall and a perimeter wall being attached to and extending downwardly therefrom, an elastic band being attached to and coextensive with said perimeter wall to retain said tray cover on a tray, said tray being extendable outwardly from said chair or from a backside of an adjacent and forwardly positioned second chair.

\* \* \* \* \*